United States Patent
Lee et al.

(10) Patent No.: US 9,465,733 B2
(45) Date of Patent: Oct. 11, 2016

(54) STORAGE DEVICE AND GLOBAL GARBAGE COLLECTION METHOD OF DATA STORAGE SYSTEM INCLUDING THE SAME

(71) Applicant: Samsung Electronics Co., Ltd., Suwon-Si, Gyeonggi-Do (KR)

(72) Inventors: Sang-Geol Lee, Seoul (KR); Wonju Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 152 days.

(21) Appl. No.: 14/244,039

(22) Filed: Apr. 3, 2014

(65) Prior Publication Data

US 2014/0372698 A1   Dec. 18, 2014

(30) Foreign Application Priority Data

Jun. 14, 2013   (KR) .................. 10-2013-0068502

(51) Int. Cl.
  G06F 12/02   (2006.01)
  G06F 11/07   (2006.01)
  G06F 3/06    (2006.01)

(52) U.S. Cl.
  CPC ............. *G06F 12/0246* (2013.01); *G06F 3/06* (2013.01); *G06F 3/0604* (2013.01); *G06F 3/0652* (2013.01); *G06F 3/0653* (2013.01); *G06F 3/0689* (2013.01); *G06F 2212/7205* (2013.01); *Y02B 60/1225* (2013.01)

(58) Field of Classification Search
  CPC ................................. G06F 12/02; G06F 11/07
  See application file for complete search history.

(56) References Cited

U.S. PATENT DOCUMENTS 8,130,554 B1   3/2012   Linnell
8,165,996 B2   4/2012   Rodriguez et al.
8,321,631 B2   11/2012  Baek
2010/0325351 A1  12/2010  Bennett (Continued)

FOREIGN PATENT DOCUMENTS

KR   2010-0069067 A   6/2010

OTHER PUBLICATIONS

Coles; Olin, "Super Talent UltraDrive ME SSD FTM28GX25H", May 13, 2009, http://archive.benchmarkreviews.com/?option=com_content&task=view&id=298&Itemid=60.*

(Continued)

*Primary Examiner* — Reginald Bragdon
*Assistant Examiner* — Edward Wang
(74) *Attorney, Agent, or Firm* — Harness, Dickey & Pierce, P.L.C.

(57) ABSTRACT

A storage device includes at least one nonvolatile memory device; and a memory controller configured to control the nonvolatile memory device, wherein the memory controller includes, at least one processor configured to control an overall operation of the memory controller; a buffer memory configured to store input/output data according to a control of the processor when an input/output request from an external device occurs; an error correction circuit configured to detect and correct an error of the input/output data; a garbage collector configured to selectively generate a first global garbage collection command in response to the input/output request and configured to perform a global garbage collection according to a second global garbage collection command received from the external device; and a storage interface configured to transmit the first global garbage collection command to another storage device.

8 Claims, 12 Drawing Sheets

(56) References Cited

U.S. PATENT DOCUMENTS

| | | | |
|---|---|---|---|
| 2012/0036309 A1* | 2/2012 | Dillow | G06F 11/108 |
| | | | 711/103 |
| 2012/0151124 A1 | 6/2012 | Baek et al. | |
| 2012/0173790 A1 | 7/2012 | Hetzler et al. | |
| 2013/0013980 A1 | 1/2013 | Cideciyan et al. | |
| 2013/0054907 A1* | 2/2013 | Ikeuchi | G06F 11/2087 |
| | | | 711/159 |

OTHER PUBLICATIONS

Sata-Io, "Port Multipliers", The Serial ATA International Organization, Mar. 2, 2012, http://www.serialata.org/technology/port_multipliers.asp.*

Jasmine OpenSSD Platform, OpenSSD Project, Jun. 22, 2011, http://www.openssd-project.org/wiki/Jasmine_OpenSSD_Platform.*

* cited by examiner

Fig. 4

| | 0 | 1 | 2 | 3 | 4 |
|---|---|---|---|---|---|
| | Features(7:0) | Device | Features(15:8) | Control | Reserved(0) |
| | Command | LBA(23:16) | LBA(47:40) | ICC 7\|6\|5\|4\|3\|2\|1\|0 | Reserved(0) |
| | C\|R\|R\|R\|PM Port | LBA(15:8) | LBA(39:32) | Count(15:8) | Reserved(0) |
| | FIS Type(27h) | LBA(7:0) | LBA(31:24) | Count(7:0) | Reserved(0) |

Fig. 5

| | | | | |
|---|---|---|---|---|
| 0 | Error | Status | R I R R PM Port | FIS Type(34h) |
| 1 | Device | LBA High | LBA Mid | LBA Low |
| 2 | Reserved(0) | LBA High(exp) | LBA Mid(exp) | LBA Low(exp)(0) |
| 3 | Reserved(0) | Reserved(0) | Sector Count(exp) | Sector Count |
| 4 | Reserved(0) | Reserved(0) | Reserved(0) | Reserved(0) |

STORAGE DEVICE AND GLOBAL GARBAGE COLLECTION METHOD OF DATA STORAGE SYSTEM INCLUDING THE SAME

CROSS-REFERENCE TO RELATED APPLICATIONS

This U.S. non-provisional patent application claims priority under 35 U.S.C. §119 to Korean Patent Application No. 10-2013-0068502, filed on Jun. 14, 2013, the entire contents of which are incorporated herein by reference.

BACKGROUND

1. Field

At least some example embodiments of the inventive concepts herein relates to a storage device and/or a global garbage collection method of a data storage system including the same.

2. Related Art

Generally, a semiconductor memory device can be classified into a volatile memory device such as a dynamic random access memory (DRAM), a static random access memory (SRAM), etc. and a nonvolatile memory device such as an electrically erasable programmable read only memory (EEPROM), a ferroelectric random access memory (FRAM), a phase-change random access memory (PRAM), a magnetoresistive random access memory (MRAM), a flash memory, etc. A volatile memory device loses its stored data when its power supply is interrupted but a nonvolatile memory device retains its stored data even when its power supply is interrupted. A flash memory has advantages of a high programming speed, low power consumption, a higher data storage capacity, etc. Thus, a data storage device based on a flash memory is widely being used. Examples of a data storage device based on a flash memory include a solid state drive (SSD) replacing an existing hard disk and a memory card such as a Secure Digital (SD) card, a MultiMediaCard (MMC), etc.

SUMMARY

Embodiments of the inventive concepts provide a storage device. The storage device may include at least one nonvolatile memory device; and a memory controller controlling the nonvolatile memory device. The memory controller comprises at least one processor controlling an overall operation of the memory controller; a buffer memory temporarily storing input/output data according to a control of the processor when an input/output request from an external device occurs; an error correction circuit detecting and correcting an error of the input/output data; a garbage collector generating a first global garbage collection command when a garbage collection is needed when the input/output request occurs or performing a global garbage collection according to a second global garbage collection command received from the external device; and a storage interface transmitting the first global garbage collection command to other storage device.

Embodiments of the inventive concepts also provide a global garbage collection method of a data storage system including storage devices and a storage controller controlling the storage devices. The global garbage collection method may include constituting one RAID by the storage devices and storing RAID constitution information in each of the storage devices; receiving an input/output request from a host; judging whether a garbage collection is needed in any one among the storage devices while performing the input/output request; judging whether a hot spare or an extra parity disk exists in the storage devices when the garbage collection is needed in the any one storage device; generating a global garbage collection command using the RAID constitution information in the storage device when the hot spare or the extra parity disk does not exist; and performing a global garbage collection in each of other storage devices except the storage device on the basis of the global garbage collection command and an internal state.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4 is a drawing illustrating a layout of a host-to-device/device-to-device frame information structure (FIS) in accordance with some exemplary embodiments of the inventive concepts.

FIG. 5 a layout of a device-to-host frame information structure (FIS) in accordance with some exemplary embodiments of the inventive concepts.

DETAILED DESCRIPTION OF EMBODIMENTS

Figure 1:
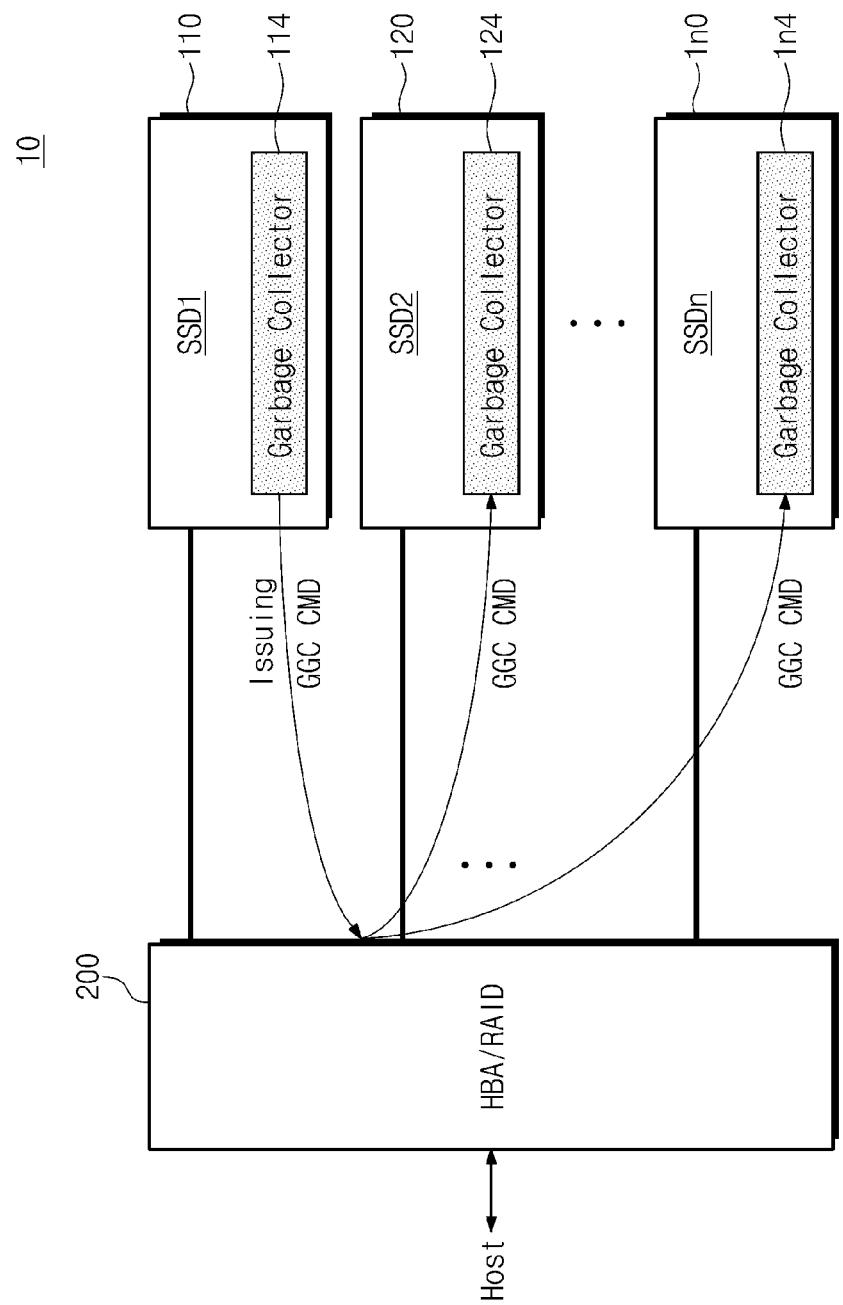
FIG. 1 is a drawing for describing at least some embodiments of the inventive concepts.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a drawing for describing some embodiments of the inventive concepts. Referring to FIG. 1, a data storage system 10 includes a plurality of storage devices SSD1~SSDn (n is a natural number of two or more) 110~1$n$4 and a storage controller (HBA/RAID) 200 connected between a host and the storage devices 110~1$n$4. The storage controller 200 can be embodied by a host bus adapter (HBA) supporting a connection of storage devices 110~1$n$0 to the host or a redundant array of independent disks (RAID) for recognizing the storage devices SSD1~SSDn as one single disk (or a virtual disk).

The data storage system 10 performs a global garbage collection (GGC). The global garbage collection (GGC) means that the storage devices 110~1$n$0 perform a garbage collection at the same time. The storage devices 110~1$n$0 can include respective garbage collectors 114~1$n$4 which generate a global garbage collection command (GGC CMD) or perform a garbage collection in response to the global garbage collection command (GGC CMD). That is, a global garbage collection command (GGC CMD) is generated in any one storage device (e.g., 110) and the generated global garbage collection command (GGC CMD) can be transmitted to the other storage devices (e.g., 120, 130, . . . , 1$n$0) via the storage controller 200.

In FIG. 1, the generated global garbage collection command (GGC CMD) passes through the storage controller 200. However, at least some embodiments of the inventive concepts are not limited thereto. A global garbage collection command (GGC CMD) generated in any one storage device can be directly transmitted to other connected storage devices.

In the storage system 10, each of the storage devices 110~1$n$0 can autonomously generate or receive a global garbage collection command (GGC CMD) and thereby work burden of the host on global garbage collection can be reduced.

Figure 2:
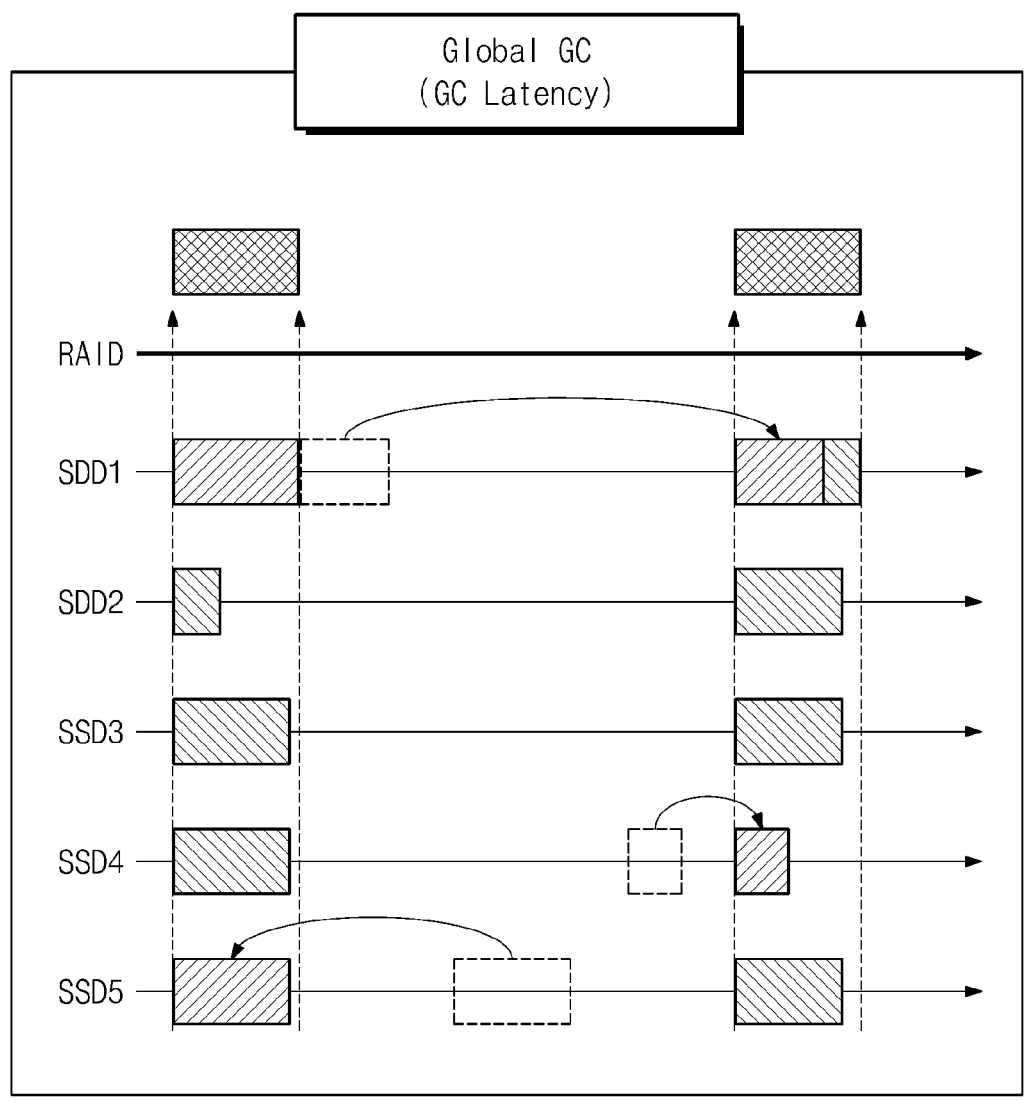
FIG. 2 is a drawing for describing a global garbage collection in accordance with some exemplary embodiments of the inventive concepts.

FIG. 2 is a drawing for describing a global garbage collection in accordance with some exemplary embodiments of the inventive concepts.

In FIG. 2, for explanation purposes, it will be assumed that the storage controller 200 illustrated in FIG. 1 is a RAID controller and the storage devices 110~1$n$0 illustrated in FIG. 1 are constituted by five SSDs (SSD1~SSD5). Thus, the data storage system 10 illustrated in FIG. 1 may look as if it is a virtual driver.

The global garbage collection illustrated in FIG. 2 can have latency so that an internal garbage collection of any one storage device SSD1 starts not at arbitrary time but in a global garbage collection section.

The global garbage collection illustrated in FIG. 2 can perform an internal garbage collection of any one storage device SSD5 to be performed at any time in a global garbage collection section in advance.

In a general data storage system, each of storage devices performs a garbage collection as the need arises. As a result, performance of a virtual driver constituted by a RAID is aligned with a storage device having the lowest performance. That is, performance of any one storage device having slow response time becomes performance of the whole virtual driver.

The data storage system 10 according to at least some example embodiments of the inventive concepts, that is, the virtual driver, can make performance of the virtual driver not assigned with performance of any one storage device by performing a garbage collection in the storage devices SSD1~SSD5 at the same time according to a global garbage collection command (GGC CMD). The data storage system 10 according to at least some example embodiments of the inventive concepts, as illustrated in FIG. 2, can prevent performance degradation of the virtual driver constituted by a RAID by performing an internal garbage collection in a global garbage collection section according to a global garbage collection command (GGC CMD). For example, the horizontal lines with arrows illustrated in FIG. 2 are timelines. Further, the boxes located at various positions within the timelines represent garbage collection operations. The position along the times lines at which the boxes are located represent the point in time at which each of the garbage collection operations take place. There are two types of garbage collection operations illustrated in FIG. 2. The filled-in boxes represent garbage collection operations executed when global garbage collection is implemented in accordance with at least one example embodiment. The dotted-line boxes represent points in time where garbage collection operations would have been performed in the absence of global garbage collection. As is illustrated in FIG. 2, when global garbage collection is implemented in accordance with at least one example embodiment, the timings of some garbage collection operations may be moved (as is indicated in FIG. 2 by the arched arrows extending from the dotted-line boxes) such that garbage collection operations for all the storage devices SSD1~SSD5 may be completed within the same time interval.

Figure 3:
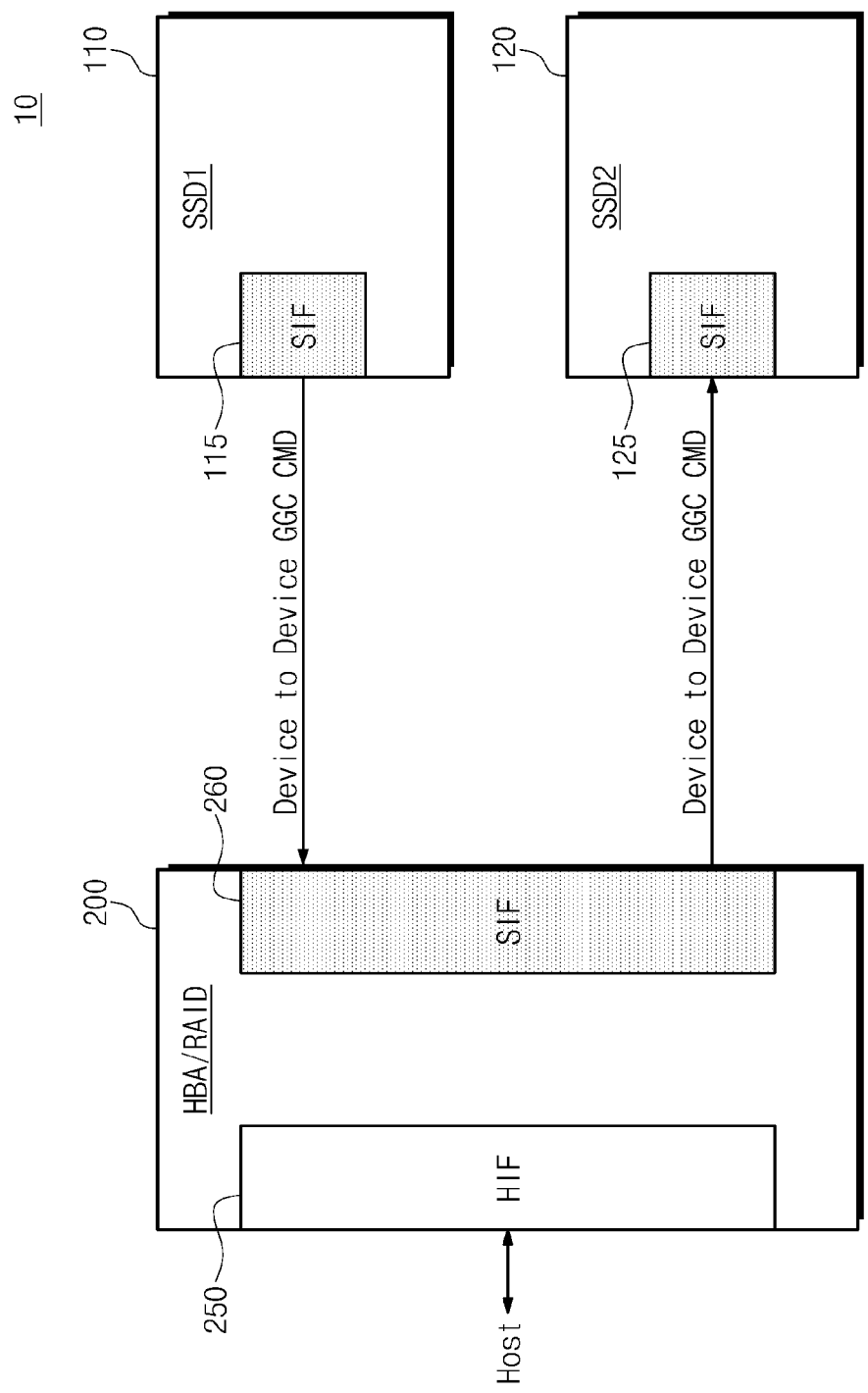
FIG. 3 is a drawing illustrating a data storage system 10 in accordance with some exemplary embodiments of the inventive concepts from the viewpoint of an interface.

FIG. 3 is a drawing illustrating a data storage system 10 in accordance with some exemplary embodiments of the inventive concepts from the viewpoint of an interface. For explanation purposes, in FIG. 3, only two storage devices 110 and 120 are illustrated. The storage devices 110 and 120 can be embodied to perform a device-to-device communication. For example, the storage devices 110 and 120 can be embodied to communicate with each other after an out of band (OOB) sequence.

The first storage device 110 judges that a global garbage collection is needed. For example, when processing an input/output request of the host, a garbage collection needs to be performed internally in the first storage device 110. At this time, the first storage device 110 generates a device-to-device global garbage collection command (GGD CMD) through a storage interface SIF 115 so that a global garbage collection is performed in the second storage device 120. Herein, the device-to-device global garbage collection command (GGD CMD) is a command being transmitted from any one storage device to another storage device.

A storage interface 260 of the storage controller (HBA/RAID) 200 receives the device-to-device global garbage collection command (GGD CMD) from the first storage device 110 and transmits the received device-to-device global garbage collection command (GGD CMD) to a target storage device, that is, the second storage device 120.

A storage interface 125 of the second storage device 120 receives a device-to-device global garbage collection command (GGD CMD). The second storage device 120 can perform a global garbage collection in response to the device-to-device global garbage collection command (GGD CMD).

The storage interfaces 115, 125 and 260 can be embodied by any one of various kinds of interfaces such as serial advanced technology attachment (SATA), small computer system interface (SCSI), serial attached SCSI (SAS), SATA Express (SATAe), non-volatile memory Express (NVMe), universal serial bus (USB), universal flash storage (UFS), peripheral component interconnect (PCI), PCI Express (PCIe), internet SCSI (iSCSI), fibre channel (FC), FC over Ethernet (FCoE), etc.

A host interface 250 of the storage controller 200 may be a different type of interface from the storage interfaces 115, 125 and 260. In another embodiment, the host interface 250 of the storage controller 200 may be the same type of interface as the storage interfaces 115, 125 and 260.

Each of the storage devices 110 and 120 can include information describing the data storage system 10. For example, when the data storage system 10 implements a RAID, each of the storage devices 110 and 120 can include RAID constitution information. The RAID constitution information can include the type of RAID configuration implemented by the data storage system 10, the number of storage devices, one or more storage device identification number, etc.

RAID constitution information may be port multiplier (PM) port information (a device port address). Each of the storage devices 110 and 120 can generate a device-to-device global garbage collection command (GGD CMD) to a target storage device using PM port information.

The data storage system 10 includes a communication protocol generating and receiving a device-to-device global garbage collection command (GGD CMD). It will be assumed that the communication protocol is a SATA/SAS protocol below.

FIG. 4 is a drawing illustrating a layout of a host-to-device/device-to-device frame information structure (FIS) in accordance with some exemplary embodiments of the inventive concepts. Referring to FIG. 4, a PM port includes an address of a target storage device. A frame information structure (FIS) type, when it is marked, for example, with 27 h, is distinguished as host-to-device or device-to-device information.

Each of the storage devices 110 and 120 illustrated in FIG. 3 generates a global garbage collection command (GGC CMD) of a frame information structure illustrated in FIG. 4.

FIG. 5 a layout of a device-to-host frame information structure (FIS) in accordance with some exemplary embodiments of the inventive concepts. Referring to FIG. 5, a frame information structure (FIS) type, when it is marked, for example, with 34 h, is distinguished as device-to-host information. The storage controller 200 according to at least some example embodiments of the inventive concepts reads the type of the received frame information structure (FIS) and determines whether to transmit a frame (command/data/address) to the host or whether to transmit the frame (command/data/address) to the storage devices according to the type of the frame information structure (FIS).

Figure 6:
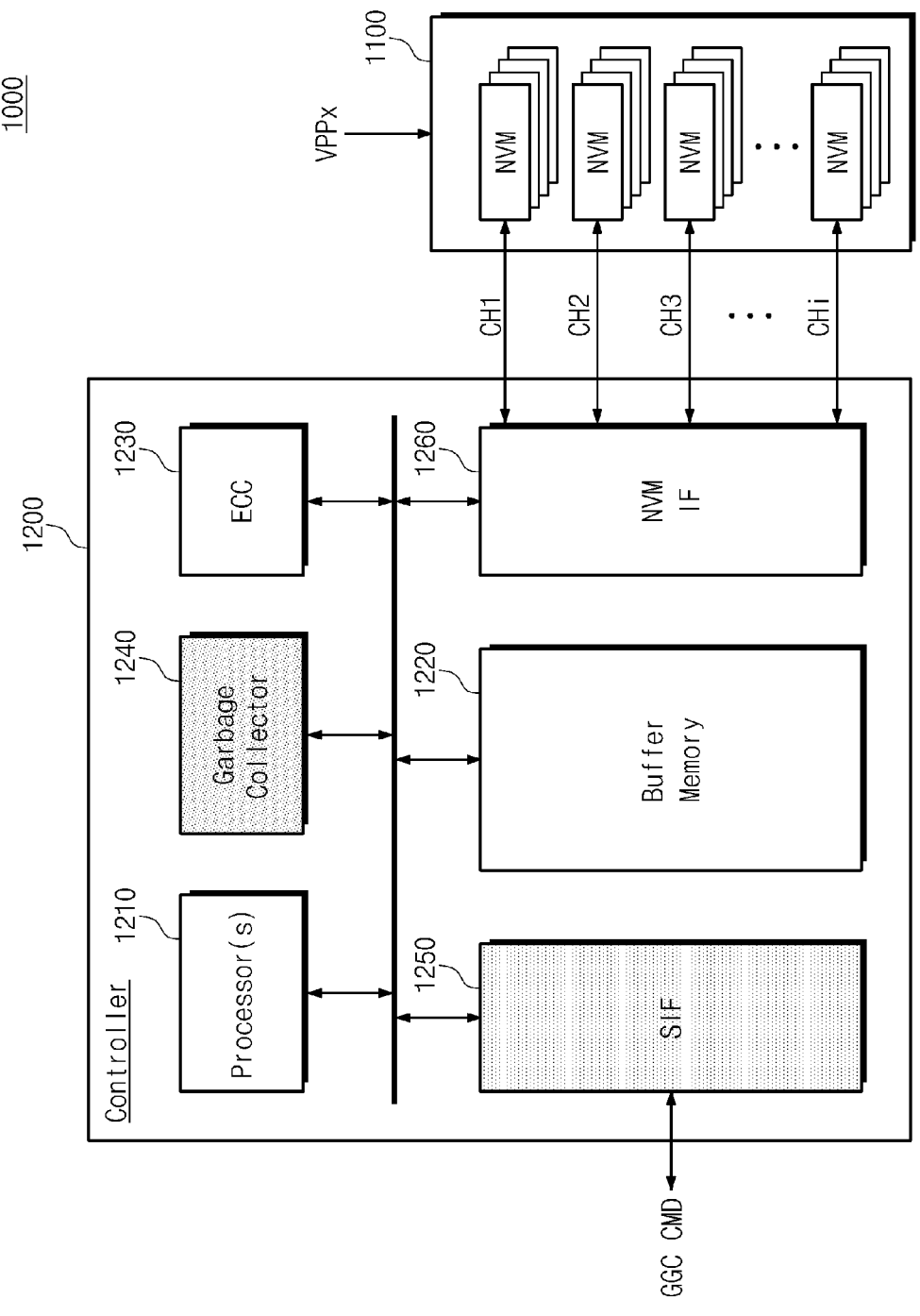
FIG. 6 is a block diagram illustrating a storage device 1000 in accordance with some exemplary embodiments of the inventive concepts.

FIG. 6 is a block diagram illustrating a storage device 1000 in accordance with some exemplary embodiments of the inventive concepts. Referring to FIG. 6, a storage device 1000 may include a plurality of nonvolatile memory devices 1100 and a memory controller 1200 controlling the nonvolatile memory devices 1100. The storage device 1000 may be, for example, a solid state drive (SSD), an embedded multimedia card (EMMC), a secure digital (SD) card, a USB flash, etc.

Each of the nonvolatile memory devices 1100 can include a plurality of memory blocks constituted by memory cells storing at least one bit. Each of the nonvolatile memory devices 1100 may be, for example, a NAND flash memory, a vertical NAND flash memory, a NOR flash memory, a resistive random access memory (RRAM), a phase change RAM (PRAM), a magnetoresistive RAM (MRAM), a ferroelectric RAM (FRAM), a spin transfer torque RAM (STT-RAM), etc.

Each of the nonvolatile memory devices 1100 can have a three-dimensional array structure. According to at least some example embodiments, the inventive concepts can be applied to not only a flash memory of which a charge storage layer is constituted by a conductive floating gate but also a charge trap flash (CTF) of which a charge storage layer is constituted by an insulating film. The nonvolatile memory devices 1100 can optionally be provided with an external high voltage Vpp.

The memory controller 1200 is connected to the nonvolatile memory devices 1100 through a plurality of channels CH1~Chi, i is an integer of two or more). The memory controller 1200 includes at least one processor 1210, a buffer memory 1220, an error correction circuit 1230, a garbage collector 1240, a storage interface (SIF) 1250 and a nonvolatile memory interface (NVM IF) 1260.

The processor 1210 can control the overall operation of the storage device 1000.

The buffer memory 1220 temporarily stores data associated with the memory controller 1200. For example, the buffer memory 1220 can temporarily store input/output data when an input/output request of the host occurs. The buffer memory 1220 temporarily stores data received from an external device so as to program the data in the nonvolatile memory devices 1100 when a write operation is performed or temporarily stores data read from the nonvolatile memory devices 1100 so as to output the data to an external destination when a read operation is performed. The buffer memory 1220 may include a plurality of memory lines storing data or command. The memory lines can be mapped to cache lines which the processor 1210 directly accesses in various ways. The cache lines may exist inside the processor 1210 or may be embodied separately outside the processor 1210.

The error correction circuit 1230 can detect and correct an error of input/output data. For example, the error correction circuit 1230 can calculate an error correction code value of data to be programmed in a write operation, can correct an error of data read in a read operation according to the error correction code value and can correct an error of data read from the nonvolatile memory device 1100 in a data restoration operation.

Although not illustrated in the drawing, the storage device 1000 can further include a code memory storing code data that is needed when driving the memory controller 1200. The code memory can be embodied by a nonvolatile memory device (e.g., a phase-change random access memory (PRAM), a magnetoresistive random access memory (MRAM), etc.).

The garbage collector 1240 can internally perform a garbage collection, can generate a global garbage collection command (GGC CMD, "first global garbage collection command") as the need arises, or can perform a global garbage collection according to a global garbage collection command (GGC CMD, "second global garbage collection command") input through the storage interface 1250 from an external device.

The garbage collector 1240 can be embodied in one or more of hardware, software and firmware.

The storage interface 1250 can provide a function of interfacing with an external device (one of the host, the storage controller and other storage device illustrated in FIG. 1). According to at least one example embodiment, the storage interface 1250 can be embodied to change a global garbage collection command (GGC CMD) generated in the garbage collector 1240 into a data structure such that another storage device can receive the global garbage collection command (GGC CMD). According to at least one example embodiment, the storage interface 1250 can be embodied to receive a global garbage collection command (GGC CMD) generated from an external device. According to at least one example embodiment, a global garbage collection command (GGC CMD) being input and output in the storage interface 1250 may be a device-to-device frame information structure.

The nonvolatile memory interface 1260 can provide an interface function between the memory controller 1200 and the nonvolatile memory device 1100.

The storage device 1000 can generate and receive a global garbage collection command (GGC CMD) and perform a global garbage collection in response to the global garbage collection command (GGC CMD) which is generated and received.

Figure 7:
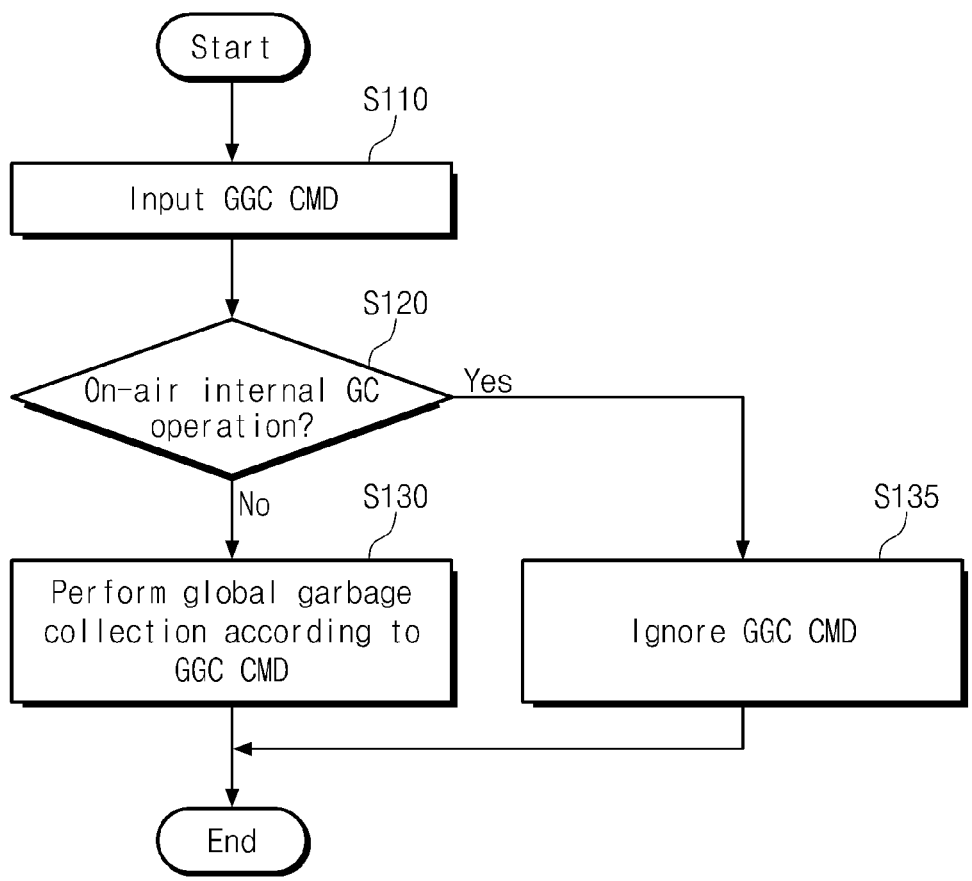
FIG. 7 is a flow chart illustrating a global garbage collection method of a storage device 1000 in accordance with some exemplary embodiments of the inventive concepts.

FIG. 7 is a flow chart illustrating a global garbage collection method of a storage device 1000 in accordance with some exemplary embodiments of the inventive concepts. Referring to FIGS. 6 and 7, a global garbage collection is performed as follows. The storage device 1000 receives a global garbage collection command (GGC CMD) (S110). The global garbage collection command (GGC CMD) is generated from another storage device and can be transmitted to the storage device 100 directly or via an external device (e.g., a host, or the storage controller 200 illustrated in FIG. 1). The garbage collector 1240 judges whether a garbage collection is internally performed (S120). According to at least one example embodiment, the garbage collector 1240 judges whether a garbage collection operation is currently being performed at the storage device 1000 when the global garbage collection command (GGC CMD) is received.

If a garbage collection is not internally performed, the garbage collector 1240 performs a global garbage collection according to the received garbage collection command (GGC CMD) (S130). If a garbage collection is internally performed, the garbage collector 1240 ignores the received garbage collection command (GGC CMD) (S135). According to at least one example embodiment, the garbage collector 1240 performs a garbage collection operation in response to the global garbage collection command (GGC CMD) is received if an internal garbage collection operation is not currently being performed at the storage device 1000, and the garbage collector 1240 ignores the global garbage collection command (GGC CMD) if an internal garbage collection operation is currently being performed at the storage device 1000.

The global garbage collection method according to some exemplary embodiments of the inventive concepts can be performed according to a global garbage collection command (GGC CMD) generated from one of storage devices of the data storage system 10. Since a garbage collection of a storage device is performed according to a global garbage collection command (GGC CMD) generated from other storage device, at least some example embodiments of the inventive concepts can be referred to as a self global garbage collection.

Figure 8:
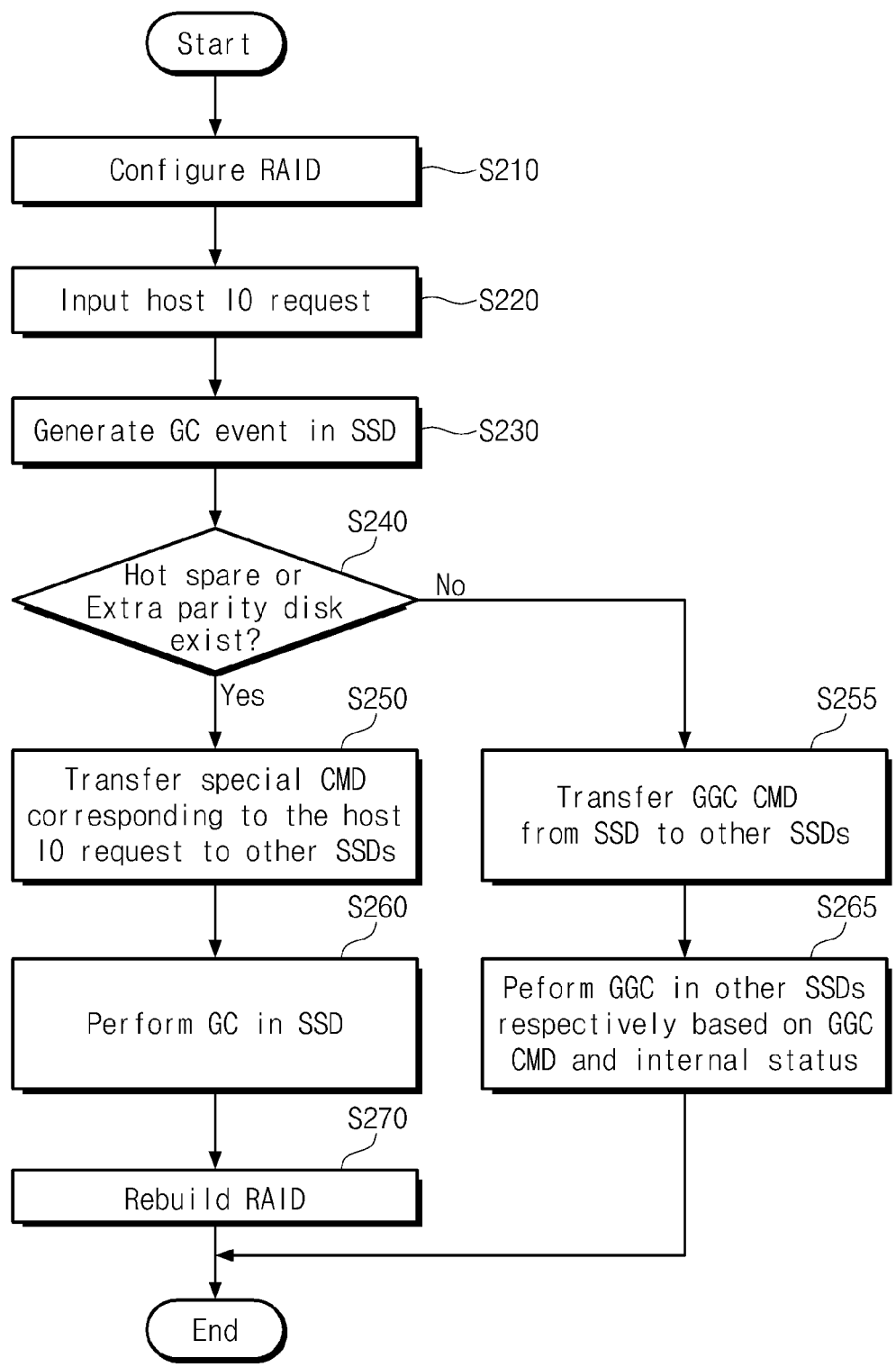
FIG. 8 is a flow chart illustrating a global garbage collection method using RAID (redundant array of independent disks) constitution information in accordance with some exemplary embodiments of the inventive concepts.

FIG. 8 is a flow chart illustrating a global garbage collection method using RAID constitution information in accordance with some exemplary embodiments of the inventive concepts. Referring to FIGS. 1 and 8, a global garbage collection method is performed as follows.

The data storage system 10 of FIG. 1 constitutes a group of RAID by the plurality of storage devices SSD1~SSDn. Accordingly, RAID constitution information (e.g., port address of the storage device) can be stored in each of the storage devices SSD1~SSDn (S210). After that, an input/output is requested from a host (S220). When processing an input/output request, a garbage collection event can be generated in any one of the storage devices SSD, for example, if one of the storage devices SSD determines a garbage collection operation is necessary to process the input/output request (S230). That is, a need of garbage collection is judged.

When a garbage collection is needed in at least a first storage device SSD, the storage device SSD judges whether a hot spare or an extra parity disk exists in a RAID (S240). The hot spare means a spare storage device that can replace an activated storage device in which defects occur. If a hot spare or an extra parity disk exists, the storage device SSD can transmit a special command to other storage devices so that an input/output request of a host can be processed in other storage devices (S250). After that, the storage device SSD can perform a garbage collection alone (S260). Accordingly, the whole performance degradation of a virtual driver constituted by a RAID is prevented. After a garbage collection of the storage device SSD is completed, a RAID group is rebuilt using a hot spare or an extra parity disk (S270).

If a hot spare or an extra parity disk does not exist, the storage device SSD generates a global garbage collection command (GGC CMD) and can transmit the generated global garbage collection command (GGC CMD) to other storage devices through a device-to-device communication (S255). Each of other storage devices performs a global garbage collection according to a global garbage collection command (GGC CMD) according to an internal state (S265). Further, according to at least one example embodiment, garbage collection is also performed on In the global garbage collection method according to some exemplary embodiments of the inventive concepts, the decision regarding whether or not to perform a global garbage collection depends on whether a hot spare or an extra parity disk exists or not.

Figure 9:
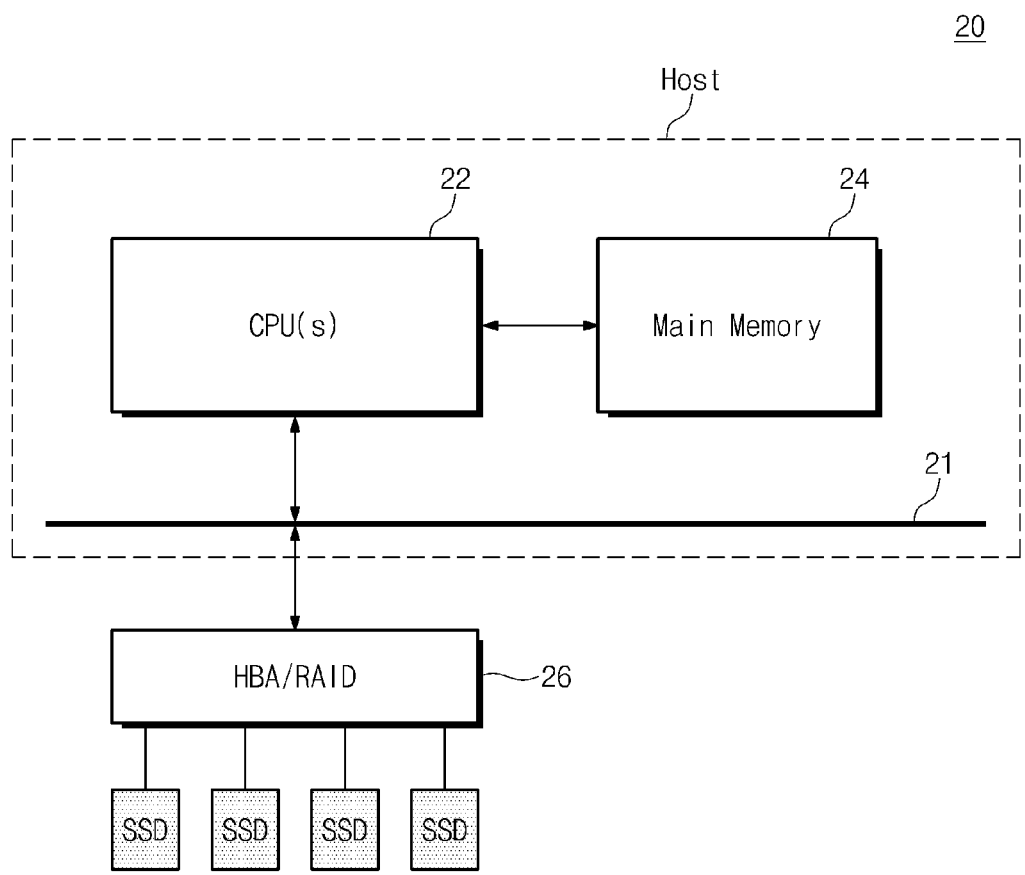
FIG. 9 is a drawing illustrating a first embodiment of a host system in accordance with some exemplary embodiments of the inventive concepts.

FIG. 9 is a drawing illustrating a first embodiment of a host system in accordance with some exemplary embodiments of the inventive concepts. Referring to FIG. 9, a host system 20 includes a host constituted by at least one central processing unit 22 and a main memory 24 and a data storage system constituted by a plurality of storage devices SSDs and a storage controller 26.

The central processing device 22 and the storage controller 26 can be connected to each other through a host bus 21. The storage device SSD according to at least some example embodiments of the inventive concepts can be embodied by the storage device 1000 illustrated in FIG. 6.

Since the data storage system autonomously performs a global garbage collection, the host system 20 does not need to consider a global garbage collection in the host. The host system 20 can reduce a burden on a global garbage collection in the host as compared with a conventional host system. The host system 20 can also greatly reduce the rate of use and power consumption of the central processing unit according to a global garbage collection.

The storage controller 26 illustrated in FIG. 9 can be connected to a limited number of storage devices. An expander can be added to increase the number of storage devices being connected to the storage controller 26. At least some example embodiments of the inventive concepts can be applied to the storage controller including an expander.

Figure 10:
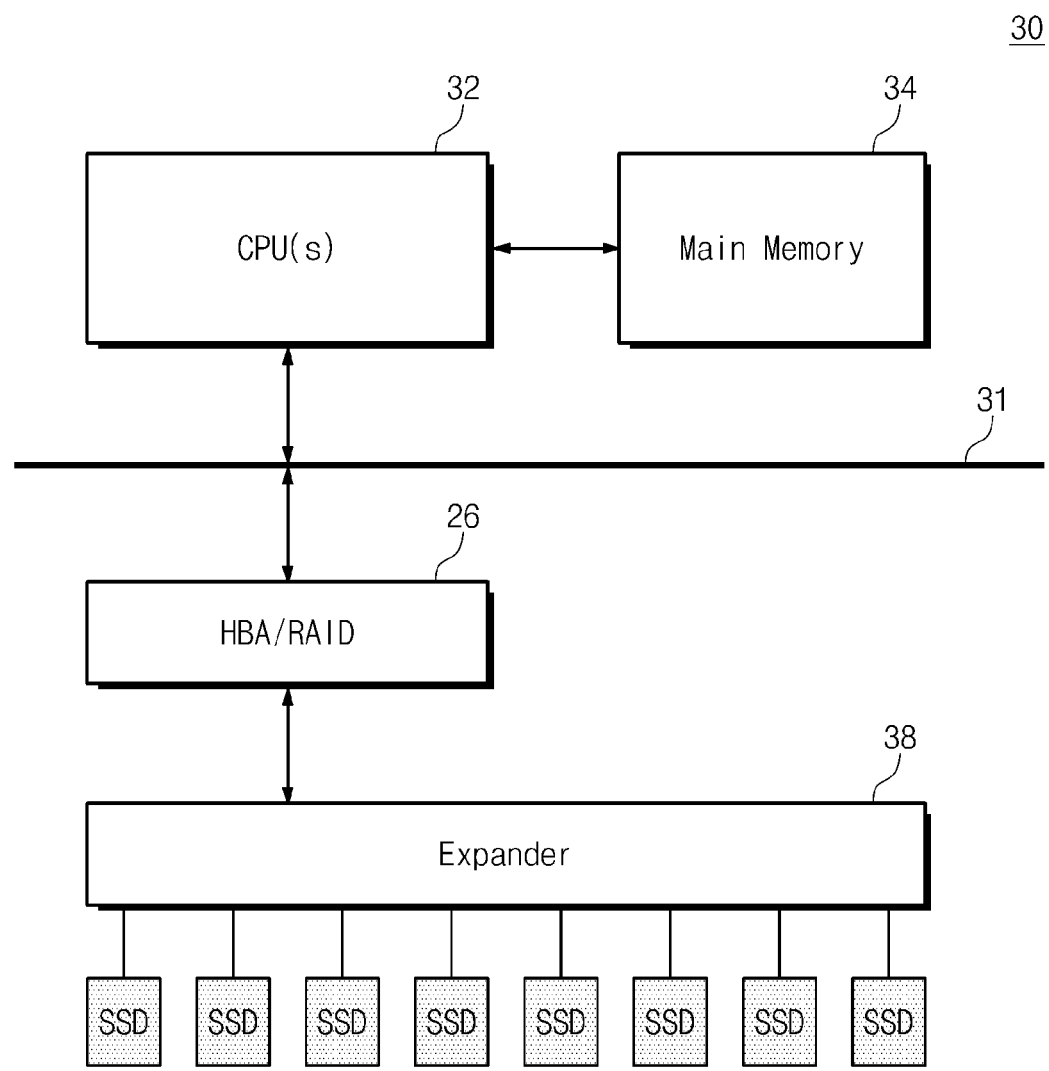
FIG. 10 is a drawing illustrating a second embodiment of a host system in accordance with some exemplary embodiments of the inventive concepts.

FIG. 10 is a drawing illustrating a second embodiment of a host system in accordance with some exemplary embodiments of the inventive concepts. Referring to FIG. 10, a host system 30 includes a host constituted by at least one central processing unit 32 and a main memory 34 and a data storage system constituted by a plurality of storage devices SSDs, a storage controller 36 and an expander 38. The storage device SSD according to at least some example embodiments of the inventive concepts can be embodied by the storage device 1000 illustrated in FIG. 6.

In FIGS. 1 and 10, a middle medium (e.g., a storage controller and an expander) exists between the host and the storage devices. However, the global garbage collection according to at least some example embodiments of the inventive concepts is not limited to that structure. At least some example embodiments of the inventive concepts can be applied to a host system in which the host and the storage devices are directly connected to each other.

Figure 11:
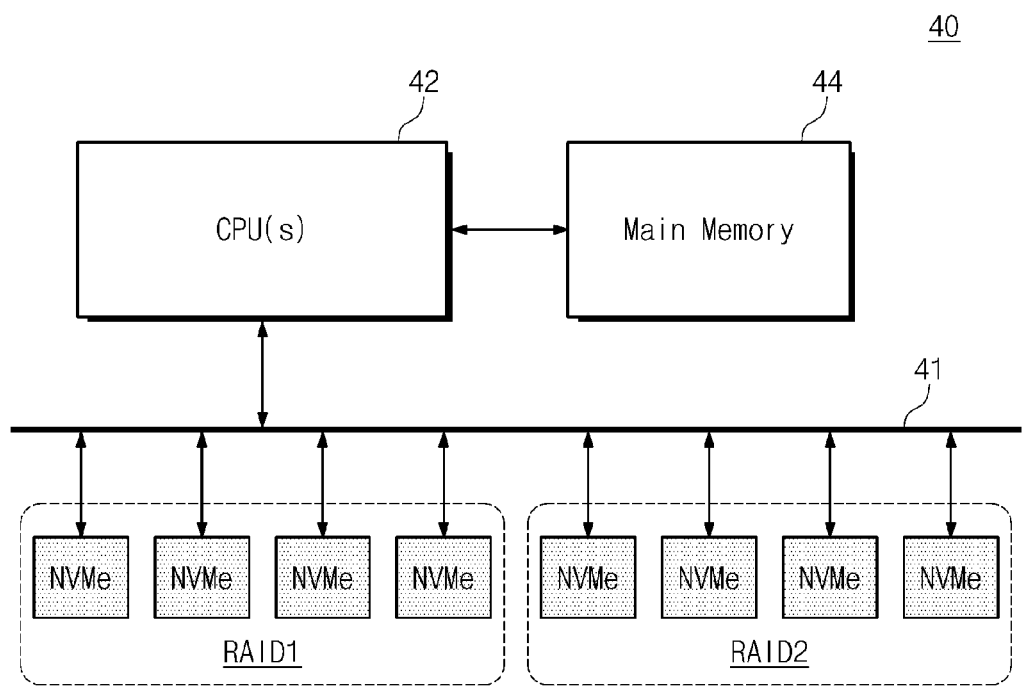
FIG. 11 is a drawing illustrating a third embodiment of a host system in accordance with some exemplary embodiments of the inventive concepts.

FIG. 11 is a drawing illustrating a third embodiment of a host system in accordance with some exemplary embodiments of the inventive concepts. Referring to FIG. 11, a host system 40 includes a host constituted by at least one central processing unit 42 and a main memory 44 and a plurality of storage devices NVMe. The storage device NVMe can be embodied to generate and receive a device-to-device global garbage collection command (Device to Device GGC CMD).

In FIG. 11, two RAID groups can be formed. Storage devices of each of the RAID groups (RAID1, RAID2) can generate and receive a global garbage collection command. After a global garbage collection is performed, a RAID is rebuilt.

The host system according to at least some example embodiments of the inventive concepts may have a structure to be used together with a hard disk drive (HDD).

Figure 12:
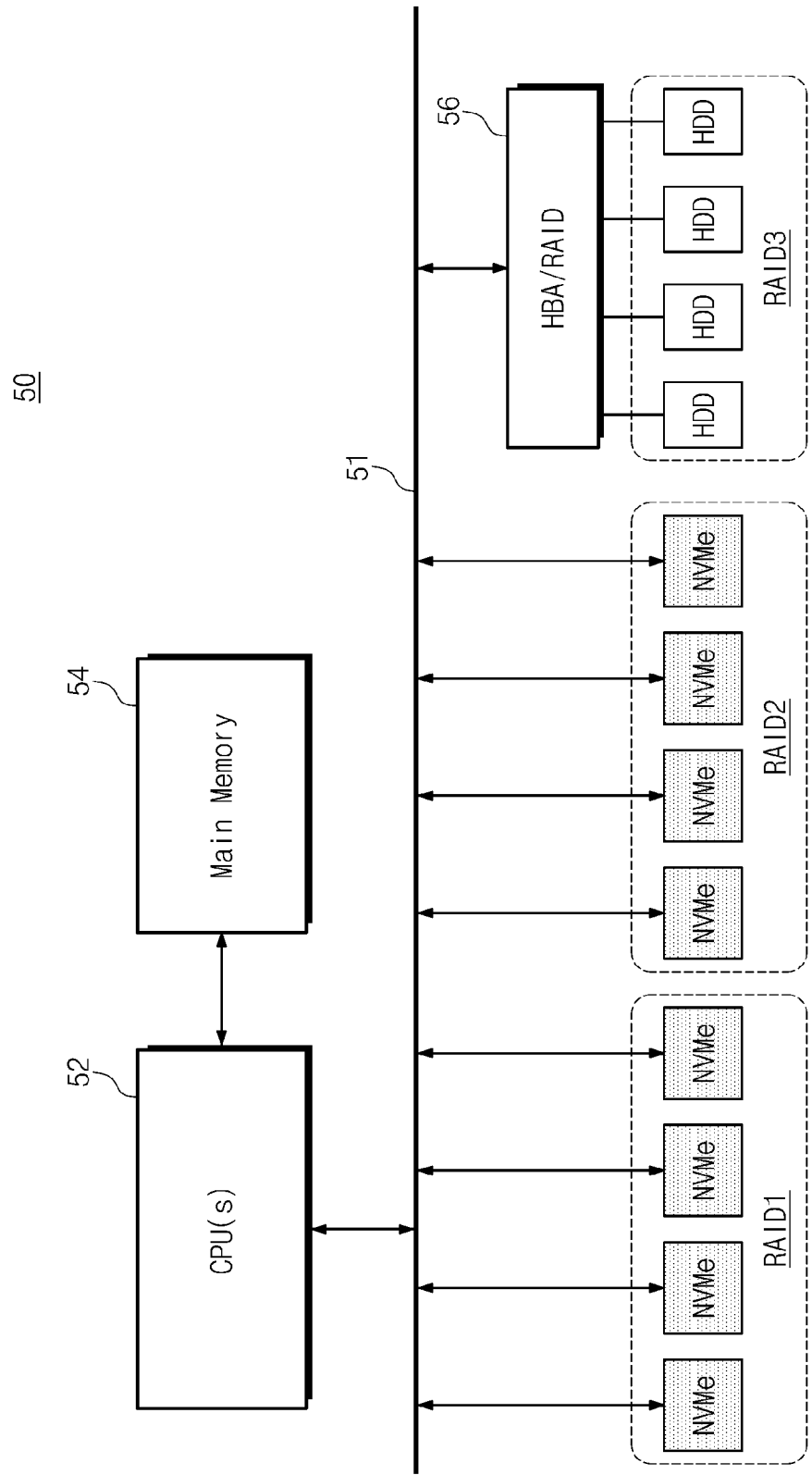
FIG. 12 is a drawing illustrating a fourth embodiment of a host system in accordance with some exemplary embodiments of the inventive concepts.

FIG. 12 is a drawing illustrating a fourth embodiment of a host system in accordance with some exemplary embodiments of the inventive concepts. Referring to FIG. 12, a host system 50 includes a host constituted by at least one central processing unit 52 and a main memory 54, RAIDs (RAID1 and RAID2) constituted by a plurality of storage devices NVMe, a storage controller 56 and a RAID3 constituted by a plurality of hard disk drives HDDs connected to the storage controller 56. Each of storage devices NVMe constituting the RAIDs (RAID1 and RAID2) can be embodied to generate and receive a device-to-device global garbage collection command (Device to Device GGC CMD).

At least some example embodiments of the inventive concepts can realize a consistent low latency environment by completely removing a performance degradation section due to a SSD garbage collection in a server environment.

At least some example embodiments of the inventive concepts can autonomously perform a global garbage collection without a cooperation of a company using a SSD by performing a global garbage collection using only SSD internal resources.

At least some example embodiments of the inventive concepts can strengthen self management performance in a server environment by setting up a network environment between SSDs included in a same RAID group using only SSD internal resources.

When generating a virtual drive using a RAID card, at least some example embodiments of the inventive concepts can equally store information (the type of RAID, the number of Devices, Device ID, etc.) related to RAID in all disks and can use the information in a Foreign Drive Import.

In accordance with at least some example embodiments of the inventive concepts, a SDD controller can perform a global garbage collection using information related to RAID stored in a disk. When a garbage collection occurs in an arbitrary SSD, the SSD can judge whether a hot spare or an extra parity disk exists. If a hot spare or an extra parity disk exists, the SSD transmits a special command to other SSD so that the other SSD can process a host IO and then can perform a garbage collection alone. By doing so, at least some example embodiments of the inventive concepts can prevent the whole performance degradation of a virtual drive.

If a hot spare or an extra parity disk does not exist, a SSD which has to perform a garbage collection transmits a special command to other SSD which belong to a same RAID group so that the other SSDs perform a garbage collection and thereby a global garbage can be performed. At this time, an address of the special command can be designated using a PM port (Device Port Address) according to a FIS of a disk communication standard such as SATA.

The memory system or the storage devices in accordance with some exemplary embodiments of the inventive concepts can be mounted using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A storage device comprising:
   at least one nonvolatile memory device; and
   a memory controller configured to control the nonvolatile memory device,
   wherein the memory controller includes,
      at least one processor configured to control an overall operation of the memory controller;
      a buffer memory configured to store input/output data according to a control of the processor when an input/output request from an external device occurs;
      an error correction circuit configured to detect and correct an error of the input/output data;
      a garbage collector configured to selectively generate a first global garbage collection command in response to the input/output request and configured to perform a global garbage collection according to a second global garbage collection command received from the external device; and
   a storage interface configured to transmit the first global garbage collection command to another storage device,
   wherein when the storage device is configured as part of a redundant array of independent disks (RAID), RAID constitution information of other storage devices is stored,
   wherein the storage device is included in the RAID with one or more other storage devices, and the storage device is configured to determine whether a hot spare or an extra parity disk exists in the RAID before the first global garbage collection command is generated, and
   wherein the storage device is configured such that the first global garbage collection command is generated in response to the storage device determining that neither the hot spare nor the extra parity disk exists in the RAID.

2. The storage device of claim 1, wherein the storage device is configured such that if the storage device determines the hot spare or the extra parity disk exists in the RAID, the storage device generates a special command instructing at least one storage device from among the one or more other storage devices to process the input/output request.

3. The storage device of claim 1, wherein the second global garbage collection command is received from at least one storage device from among the one or more other storage devices via a storage controller.

4. A global garbage collection method of a data storage system including a plurality of storage devices and a storage controller controlling the plurality of storage devices comprising:
   configuring the plurality of storage devices as a redundant array of independent disks (RAID);
   storing RAID constitution information in each of the plurality of storage devices;
   receiving an input/output request from a host at a storage device from among the plurality of storage devices;
   determining whether a hot spare or an extra parity disk exists within the plurality of storage devices; and
   if neither the hot spare nor the extra parity disk is determined to exist,
      generating a global garbage collection command using the RAID constitution information stored in the storage device; and
      performing a global garbage collection in each of one or more other storage devices on the basis of the global garbage collection command and an internal state of each of the one or more other storage devices, respectively, the one or more other storage devices being the one or more storage devices, from among the plurality of storage devices, other than the storage device.

5. The global garbage collection method of claim 4, further comprising:
   if at least one of the hot spare and the extra parity disk is determined to exist,
      transmitting a special command from the storage device to each of the other storage devices, the command causing at least one of the other storage devices to process the input/output request.

6. The global garbage collection method of claim 5, further comprising:
   if at least one of the hot spare and the extra parity disk is determined to exist,
      performing the garbage collection in the storage device.

7. The global garbage collection method of claim 6, further comprising:
   if at least one of the hot spare and the extra parity disk is determined to exist,
      reconstituting the RAID after completing the garbage collection in the storage device.

8. The global garbage collection method of claim 4, wherein each of the storage devices is a SSD.

* * * * *